Patented May 26, 1942

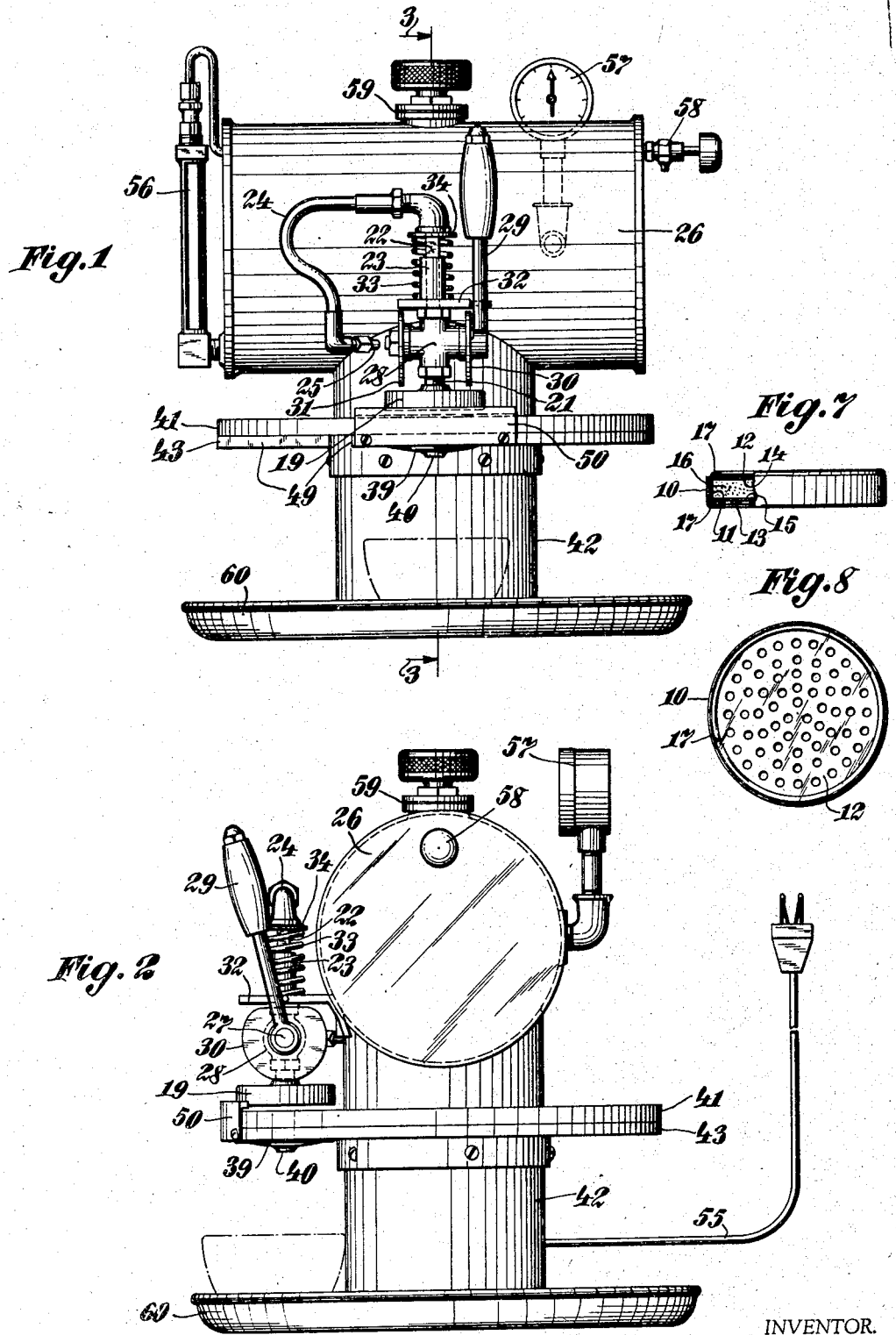

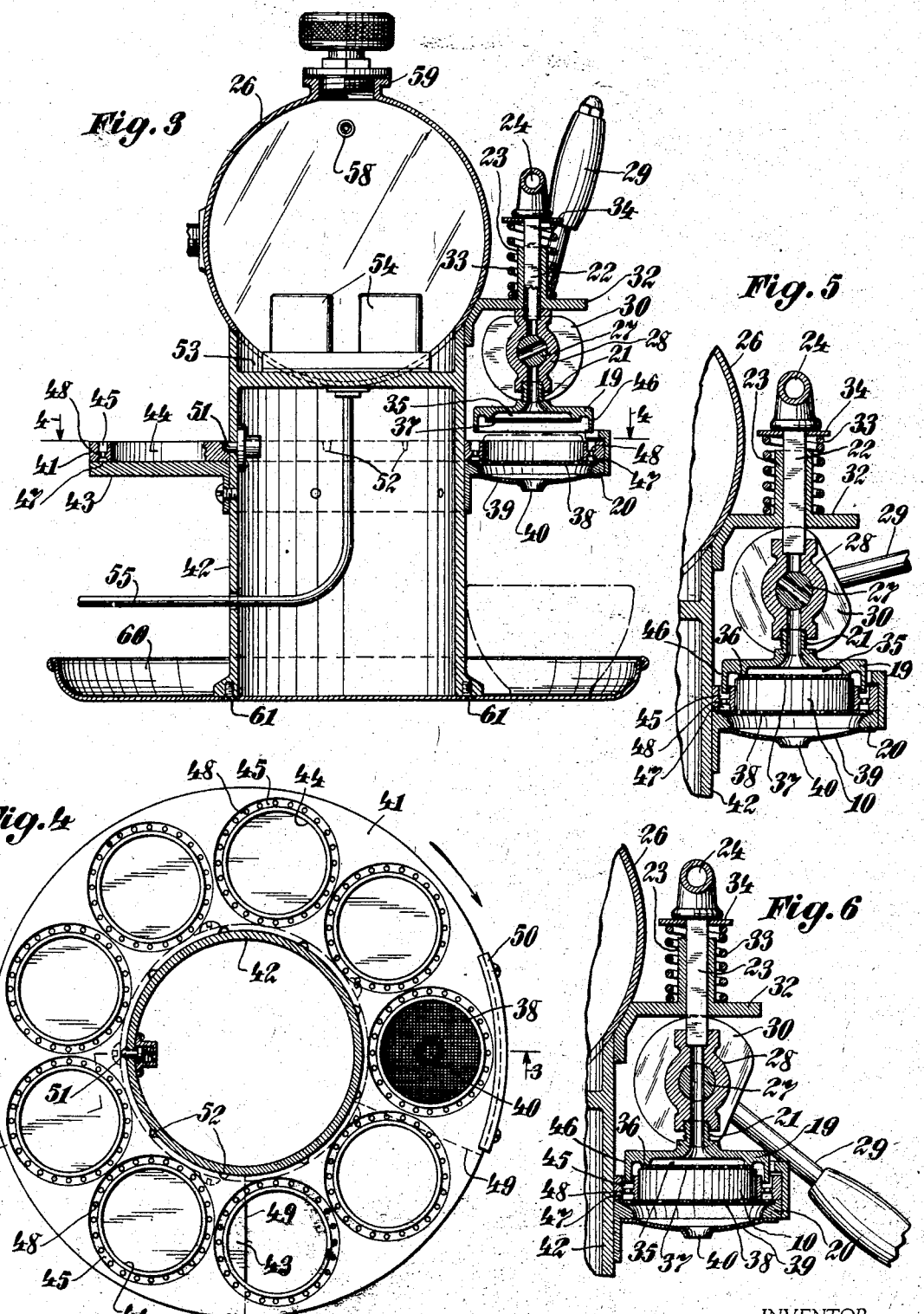

2,283,967

UNITED STATES PATENT OFFICE 2,283,967

BEVERAGE APPARATUS

William F. Brown, Flushing, N. Y.

Application October 10, 1940, Serial No. 360,570

9 Claims. (Cl. 53—3)

The invention here disclosed relates to apparatus for making beverages, such as coffee, tea, cocoa, chocolate, beef and vegetable extracts and the like.

Special objects of the invention are to provide simple and practical apparatus for making beverages from cartridges containing the elements or ingredients for such beverages and which apparatus will enable the production quickly of one fresh cup after another of any one or any selected number of beverages.

Further desirable objects and the novel features of construction, combinations and relations of parts by which all objects are attained, will appear as the specification proceeds.

The drawings accompanying and forming part of the specification illustrate one of the commercial embodiments of the invention. The structure however may be modified and changed as regards this disclosure, all within the true spirit and broad scope of the invention, as hereinafter defined and claimed.

Fig. 1 is a front elevation of one of the machines, parts appearing in section.

Fig. 2 is a side view of the same.

Fig. 3 is an enlarged vertical sectional view as on substantially the plane of line 3—3 of Fig. 1.

Fig. 4 is a further enlarged horizontal sectional view on substantially the plane of line 4—4 of Fig. 3.

Figs. 5 and 6 are enlarged broken sectional details, which with Fig. 3 illustrate successive positions in the operation and use of the cartridge clamping head and valve mechanism.

Figs. 7 and 8 are broken sectional and plan views respectively of one of the cartridges holding the ground coffee or other infusion material.

The present invention is related to that disclosed in copending patent application, Ser. No. 230,915, filed September 21, 1938, in that the coffee or the other material for the beverage is packed in individual cup quantity cartridges of a size and shape to be clamped in the machine while hot boiling water and steam is forced under pressure through the charge of material.

A cartridge of the preferred form, as disclosed in the patent application referred to is illustrated in Figs. 7 and 8, consisting of opposed caps having imperforate telescopically joined annular side walls 10, 11, perforated top and bottom walls 12, 13, and pervious wafer liners 14, 15, of filter paper, or the like, for retaining the powdered material 16. For the purpose of holding the flavor and keeping the material fresh, the entire cartridge may be sealed as by dipping the same in tasteless gelatin. The telescopically joined caps may be of metal, fiber, paper, or other materials. In making them of paper, it is preferable to press the caps with slightly raised annular beads 17, at the juncture of the perforated top and bottom walls with the imperforate rim portions 10, 11, to serve as packing rings when the cartridge is clamped in the machine.

Figs. 3, 5 and 6, show how the cartridges are enclosed and held at the point of infusion between upper and lower cup shaped clamping heads 19, 20. The upper clamping head is shown as carried by a tubular plunger structure 21, having a squared portion 22, slidingly held in a correspondingly shaped guide 23. The upper end of this plunger is shown provided with flexible tubing 24, connected at 25, with the boiler or source of hot water supply 26.

Flow of hot liquid from the boiler down through the plunger to the upper clamping head is controlled in the illustration by a rotary valve plug 27, journalled in the valve body 28, in the intermediate or lower portion of the plunger, said valve being operable by a lever handle 29.

Up and down movement of the valved plunger head is effected and controlled by two cam discs 30, 31, fixed to opposite ends of the rotary valve plug and engageable with the overstanding shelf or abutment 32, which carries or forms the plunger guide 23. A spring 33, interposed between the top of this shelf and an abutment washer 34, on the upper end of the plunger, serves to lift the plunger as it is released by cams 30, 31.

In Fig. 3, the upper or movable clamping head is shown fully raised and the valve in fully closed position.

Fig. 5 shows the cams (30, 31) turned far enough to fully close the upper head down over an interposed cartridge but with the valve still closed.

Fig. 6 illustrates the final position in which the substantially circular portions of the cams are holding the top head clamped tightly down over the cartridge and the valve is opened to admit the fluid under pressure from the boiler to the cartridge.

The upper clamping head is shown as recessed or cut back at 35, to form a flat shallow circular chamber and an annular surrounding rim 36. This solid annular rim is of a diameter approximating that of the cartridge and therefore in position to bear on the upper sealing rib or bead 17. The perforated disc 37, secured to the rim 36, partially closes the chamber 35, and has the effect of forming a spray nozzle for distributing flow of the hot fluid over the perforated top of the cartridge.

The lower member 20, of the cartridge receiving chamber is shown as having a screen or perforate bottom 38, on which the cartridge is supported and below that a collecting chamber 39, having a central spout 40, for delivering the beverage into a cup or other vessel.

Delivery of the cartridges to the infusion chamber and removal of the spent cartridges is provided for in the illustration by an annular carrier or ring 41, rotatably engaged about the hollow cylindrical stand 42, on an outstanding generally circular flange or shelf 43, and having substantially cylindrical openings 44, therethrough, of a size to snugly receive and form seats for the individual cartridges.

The rotary carrier ring 41, is shown as of slightly less thickness than the height of the cartridges and as having concentric annular troughs 45, about the cartridge openings 44, to freely receive the dependent annular flange 46, of the cartridge clamping head 19 (Figs. 5 and 6). Complemental annular troughs 47, at the underside of the carrier ring, in registration with the troughs at the upper side and in communication by perforations 48, provide drainage for any accidental leakage there might be about the rim of the cartridge. The flange 46, of the upper head by dipping down into the troughs 45, Figs. 5 and 6, directs any escaping steam or liquid downward, thus to force it to drain down through the discharge spout.

The flange or shelf 43, on which the ring carrier rides may have the discharge chamber 39, formed directly therein, substantially as indicated in Figs. 3, 5 and 6. Adjacent this station, the shelf is shown cut away at 49, Fig. 4, to permit discharge of the spent cartridges by simply dropping them down out of the seats 44.

While the weight of the ring carrier will normally hold it seated down on the supporting shelf, some positive means for so retaining it may be provided, such as the short arcuate angular flange 50, Fig. 4, overstanding the edge of the carrier adjacent the infusion station.

Step-by-step movement is facilitated and centering of the cartridge carrier over the discharge chamber is provided in the disclosure by a spring pressed button 51, Figs. 3 and 4, engageable with appropriately placed notches 52, in the inner circumference of the carrier ring.

In Fig. 3, the boiler is shown as a substantially cylindrical shell secured down over a chamber 53, formed in the upper end of the hollow post 42. This chamber provides a substantial mounting for the electrical immersion heater units 54, to which current is furnished through an electrical cord 55, extending from the bottom of the heating chamber and out through an opening in the side of the column, below the carrier supporting shelf.

The boiler may be equipped with a suitable water gage 56, Fig. 1, pressure gage 57, pressure relief valve 58, and filling plug 59.

To afford a substantial base for the machine and at the same time provide a holder for cups and for discharged cartridges and possibly any drip from the carrier and shelf, there is provided in the present disclosure, a substantially circular tray 60, having an upturned rim and suitably secured to the bottom of the hollow column as by screw fastenings 61.

While a portable form of apparatus has been illustrated, to be filled with water and be charged with cartridges as required, the invention contemplates apparatus of a stationary type with the boiler connected with a water service supply and equipped with water level control, low water alarm, pressure, thermostatic and such other necessary or desirable controls and safeguards as may be required.

In use, that part of the carrier ring over the solid portion of the supporting shelf 43, may be loaded with cartridges and since the cartridges are sealed, no flavor is lost by allowing them to remain there until required. Assuming the water to be boiling and under pressure, all that is needed is to turn the ring, clockwise in Fig. 4, to carry one of the cartridges over the screened discharge chamber 39. Fig. 3 shows this condition with one of the cartridges indicated in broken lines at 10. Upon rocking the handle 29, downwardly, the cams 30, 31, will close the upper clamping head 19, down over the cartridge and then as movement of the handle is continued, the valve 27, will open flow of hot water under steam pressure through flexible connection 24, and hollow plunger 21. At such time, the cartridge is cupped between the upper and lower clamping heads, held tightly and in substantially non-leaking condition, gripped at the annular beads 17, at the rim of the cartridge so that substantially all fluid will be forced to flow through the perforate top and bottom of the cartridges, within the outline of the double walled imperforate rim portions 10, 11, of the cartridge. The perforated plate 37, spreads the flow more or less uniformly across the top of the cartridge causing the fluid to act on all portions of the generally flat disc-like package of material. The action is immediate, continuous and complete. The pressure forces the boiling water through the material so quickly that the handle may be rocked upwardly to the Fig. 5 position to cut off the flow, the instant before it is seen that the cup will be filled. With the water so hot, a certain amount of evaporation takes place the instant the valve is closed and this has the effect of drying the spent material, so that there is an absence of drip and the cartridge is therefore ready to be discharged immediately. Consequently, the handle can then be raised without delay, to the full upper position, Fig. 3, to clear the cartridge and the ring be turned a step to carry the spent cartridge over the discharge position at 49, Fig. 4, where the spent cartridge in the hot and more or less dry condition, will drop out or may be pushed out of its seat in the ring. The spring pressed detent 51, Figs. 3 and 4, aids in this step-by-step movement of the carrier ring, particularly by retaining it at each station and restraining or preventing any too free movement between stations. The cartridges are firmly held so that there should be no leakage, but if any leakage does occur as might be possible from a defective cartridge, any escape of fluid is controlled by the dependent annular flange of the plunger head, which comes down over the annular wall in which the cartridge is seated and thereby confines escaping fluid and forces it to pass downwardly and out through the screened or perforate cartridge support at the bottom. The two cams at opposite ends of the valve and on opposite sides of the plunger balance the thrust and promote smooth, easy valve and plunger operation.

The substantially circular portions of the cams enables these cams to hold the cartridges clamped and sealed in the infusion chamber during opening and closing movements of the valve, thus enabling regulation of the liquid flow to a desired extent, for instance, for the hot liquid under pressure to be delivered and cut off more or less gradually. The cartridges being of less height than the thickness of the carrier ring are firmly gripped without interference from the ring and the closing movement of the plunger head is sufficient to assure positive gripping and sealing, despite variations in size of the cartridge natural in manufacturing.

The action may be termed a high temperature pressure extraction, since the water, in order to provide the necessary delivery pressure is above the boiling point. Water of such temperature is the most effective for extracting the desirable qualities of such materials as coffee, tea and the like. With such pressure behind it, the fluid, water and steam, is forced quickly through all portions of the material. The delivery passage may be as large as need be to accomplish the rapid extraction or be branched if desired, into a number of parallel passages. The extraction may be made in a succession of steps instead of in a single continuous flow, as by opening and closing the valve a number of times, with the plunger head held closed over the cartridge as in Figs. 5 and 6.

Cartridges of different materials may be used in the same machine, enabling different drinks to be produced, as required. The cartridges may be of different sizes and shapes, the seats or openings in the carrier being correspondingly shaped, or if desired, adapters used which will seat in the full rigid openings and provide seats for smaller sized cartridges disposed in such adapters. With different size openings in the carrier, extractor stations with cartridge holding clamps of different sizes to suit, may be provided. In addition to serving for strictly beverage producing purposes, the apparatus may be used as a hot water generator, usable when so desired, for washing or sterilizing cups, or the like.

For a permanent installation, a number of the extractor heads may be located at different points, for instance, along a lunch counter and connected by suitably insulated piping with a single boiler, automatically controlled and located for instance, at some convenient point under the counter.

Frequently beverages of different strength are required and this may be provided for either by size of the cartridge, the quantity of material in the cartridge or by provision of a hot water bypass controllable for instance, by a partial movement of the valve one way or the other, to deliver through a separate pipe leading from the valve a quantity of plain hot water into the cup or receiving vessel. The latter is readily provided by an extra port in the valve, opening through a separate delivery tube upon movement of the valve to a certain position. The rotary type of valve shown is readily adapted to such an extra purpose and while a rotary form of valve may generally be preferred, particularly because of the cam function combined with it, it should be understood that other forms of valves may be employed. Also that other forms of cams than the rotary type indicated may be employed. The cam mechanism also may be used to effect the plunger raising movement, instead of relying on the spring. While the ring form of cartridge carrier is at present preferred, it should be understood that rectilinear or other type carriers may be utilized. Also that the action of the carrier may be automatic or semi-automatic instead of being manually operable, as illustrated. Further that the charging of the carrier with cartridges and discharge of cartridge may be automatic or semi-automatic.

If desired, a self-closing safety valve, either spring loaded or weight closed may be incorporated in the filling plug at 59, in which case the relief cock 58, may not be considered necessary.

While the form of cartridge illustrated is a preferred construction, it should be understood that the structure may be modified, for instance, by crimping the two shells of the cartridge together instead of connecting them by a telescopic joint, or possibly eliminating the filter paper over the perforations in the shells and making these perforations small and fine enough to hold the contained material, particularly when sealed with gelatin or other tasteless or non-harmful soluble material.

It is also possible, when the filter paper is used, to first coat or impregnate such paper with the gelatin-like varnish or coating material before putting such paper in the capsules or to spray this tasteless sealing medium over the paper in the capsule, so as to thereby secure the paper in place, before filling the capsule. Such material in any case, in addition to sealing, actually strengthens the cartridge. Rice filter paper has been found desirable, particularly because it has no odor or taste but other materials may be used. Wax and vegetable varnish may be used in place of gelatin. The sealing material may be applied by spraying or coating in other ways or by dipping the charged cartridge in the liquid sealing material. The cartridges may be made of paper, cardboard, fiber or the like. At present it is preferred to use a vulcanized fiber made from cotton linters since this has all the prerequisites of tastelessness and odorlessness and has stiffness and strength to a desirable degree. While the materials to be extracted may usually be in the granular, pulverized or some other discrete form, in other instances, the material, such as meat or vegetable extract, chocolate and the like, may be in the nature of a more or less solid block and this may be perforated or otherwise made pervious or porous to the high temperature pressure flow of fluid. Instead of the completely rotary form of carrier illustrated, such carrier may be in the form of an oscillating lever having one or more pockets for the cartridges and adapted to be swung back and forth to transport the cartridges between loading, extraction and discharge stations.

What is claimed is:

1. Beverage infusion apparatus, comprising in combination, a supporting column, a boiler mounted on the top of said column, a carrier ring rotatably confined on the column below said boiler, said ring having openings extending therethrough, beverage cartridges of a size and shape to fit said openings and having perforate upper and lower walls and imperforate rim portions, a perforate support for said cartridges at one point in the rotary movement of said carrier ring, a vertically operating tubular plunger above said perforate support and engageable over the top of a cartridge in the carrier over said perforate support, liquid supply connections from said boiler to said tubular plunger, a rotary valve controlling flow through said tubular plunger and cam means operable by said rotary valve to control up and down movement of said plunger.

2. Beverage infusion apparatus, comprising in combination, a supporting column, a boiler mounted on the top of said column, a carrier ring rotatably confined on the column below said boiler, said ring having openings extending therethrough, beverage cartridges of a size and shape to fit said openings and having perforate upper and lower walls and imperforate rim portions, a perforate support for said cartridges at one point in the rotary movement of said carrier ring, a vertically operating tubular plunger above said perforate support and engageable over the top of a cartridge in the carrier over said perforate support, liquid supply connections from said boiler to said tubular plunger, a rotary valve controlling flow through said tubular plunger, cam means operable by said rotary valve to control up and down movement of said plunger and a shelf carried by the column for supporting cartridges seated in the carrier openings, said shelf being open at one point to pass spent cartridges.

3. Beverage infusion apparatus, comprising in combination, a supporting column, a boiler mounted on the top of said column, a carrier ring rotatably confined on the column below said boiler, said ring having openings extending therethrough, beverage cartridges of a size and shape to fit said openings and having perforate upper and lower walls and imperforate rim portions, a perforate support for said cartridges at one point in the rotary movement of said carrier ring, a vertically operating tubular plunger above said perforate support and engageable over the top of a cartridge in the carrier over said perforate support, liquid supply connections from said boiler to said tubular plunger, a rotary valve controlling flow through said tubular plunger, cam means operable by said rotary valve to control up and down movement of said plunger and cam mechanism including a cam for forcing the plunger downwardly into cartridge engaging position and a spring for raising the plunger.

4. Beverage infusion apparatus, comprising in combination, a supporting column, a boiler mounted on the top of said column, a carrier ring rotatably confined on the column below said boiler, said ring having openings extending therethrough, beverage cartridges of a size and shape to fit said openings and having perforate upper and lower walls and imperforate rim portions, a perforate support for said cartridges at one point in the rotary movement of said carrier ring, a vertically operating tubular plunger above said perforate support and engageable over the top of a cartridge in the carrier over said perforate support, liquid supply connections from said boiler to said tubular plunger a rotary valve controlling flow through said tubular plunger, cam means operable by said rotary valve to control up and down movement of said plunger, a shelf on the column for supporting cartridges seated in the carrier openings and having a cartridge discharge passage and a tray forming a base for the column and extending beneath said cartridge discharge passage and beneath the perforate cartridge support.

5. In apparatus of the character disclosed, the combination of a carrier having an annular wall providing a seat for a cartridge, a perforate support beneath said annular wall, a plunger reciprocable above and having a head with a dependent flange movable down over said annular wall, said plunger having a liquid passage therethrough, a rotatable valve intersecting said passage and a cam carried by said valve for effecting reciprocation of said plunger.

6. In apparatus of the character disclosed, the combination of a carrier having an annular wall providing a seat for a cartridge, a perforate support beneath said annular wall, a plunger reciprocable above and having a head with a dependent flange movable down over said annular wall, said plunger having a liquid passage therethrough, a rotatable valve intersecting said passage, and cams at the opposite ends of said valve for controlling reciprocation of said plunger.

7. In apparatus of the character disclosed, the combination of a carrier having an annular wall providing a seat for a cartridge, a perforate support beneath said annular wall, a plunger reciprocable above and having a head with a dependent flange movable down over said annular wall, said plunger having a liquid passage therethrough, a rotatable valve intersecting said passage, a cam carried by said valve for effecting reciprocation of said plunger, said carrier having annular drainage troughs in the upper and lower faces of the same about said annular wall and perforations connecting said troughs to enable escape of fluid through said perforate cartridge support at the bottom.

8. In apparatus of the character disclosed, the combination of opposed relatively movable hollow members cooperable to provide a chamber for holding an infusion cartridge, one of said members including a reciprocable tubular plunger, a fluid flow controlling valve rotatably disposed in said plunger and cam means operable to effect reciprocation of said plunger and including an abutment and a cooperating cam connected with said rotatable valve having a substantially concentric portion for maintaining the plunger in substantially one position throughout a predetermined angle of valve opening and closing movement.

9. In apparatus of the character disclosed, the combination of a cartridge composed of telescopically engaged shells having pervious top and bottom and substantially impervious side walls, said cartridge containing a measured quantity of ground coffee or other material to be extracted, a liquid delivery passage having a chamber to receive said cartridge and including opposed relatively movable parts forming walls of said passage and cooperatively engageable with said substantially impervious side walls of the cartridge to clamp the telescopically engaged portions of the same in place and to compel flow of liquid in said passage to be through the pervious end walls of the cartridge confined therebetween, means for effecting relative movement of said parts to clamp said cartridge in substantially liquid tight relationship in said chamber or to release said cartridge for removal from said chamber, valve means controlling flow of fluid under pressure through said liquid delivery passage, said means for effecting relative movement of the aforesaid parts including cam mechanism and means interconnecting and for operating said valve mechanism and said cam mechanism.

WILLIAM F. BROWN.